T. BRADSHAW.
MACHINE FOR CUTTING CURVED STRIPS.
APPLICATION FILED DEC. 7, 1914.

1,162,331.

Patented Nov. 30, 1915.

WITNESSES:
F. C. Fliedner
L. N. Ball

INVENTOR,
Thomas Bradshaw
BY Francis M. Wright,
ATTORNEY

COLUMBIA PLANOGRAPH CO., WASHINGTON, D. C.

UNITED STATES PATENT OFFICE.

THOMAS BRADSHAW, OF EAST OAKLAND, CALIFORNIA.

MACHINE FOR CUTTING CURVED STRIPS.

1,162,331.  Specification of Letters Patent.  Patented Nov. 30, 1915.

Application filed December 7, 1914. Serial No. 875,835.

*To all whom it may concern:*

Be it known that I, THOMAS BRADSHAW, a citizen of the United States, residing at East Oakland, in the county of Alameda and State of California, have invented new and useful Improvements in Machines for Cutting Curved Strips, of which the following is a specification.

A successful casing for pneumatic tires is made of narrow, elliptical strips of the material known as rubber belting, which consists of rubber in which canvas is embedded, said strips being arranged side by side at an angle of about 45° with the plane of the tire, and then vulcanized so as to make a continuous sheet.

The object of the present invention is to provide a machine for rapidly and economically cutting said strips from a sheet of rubber belting.

Figure 1:
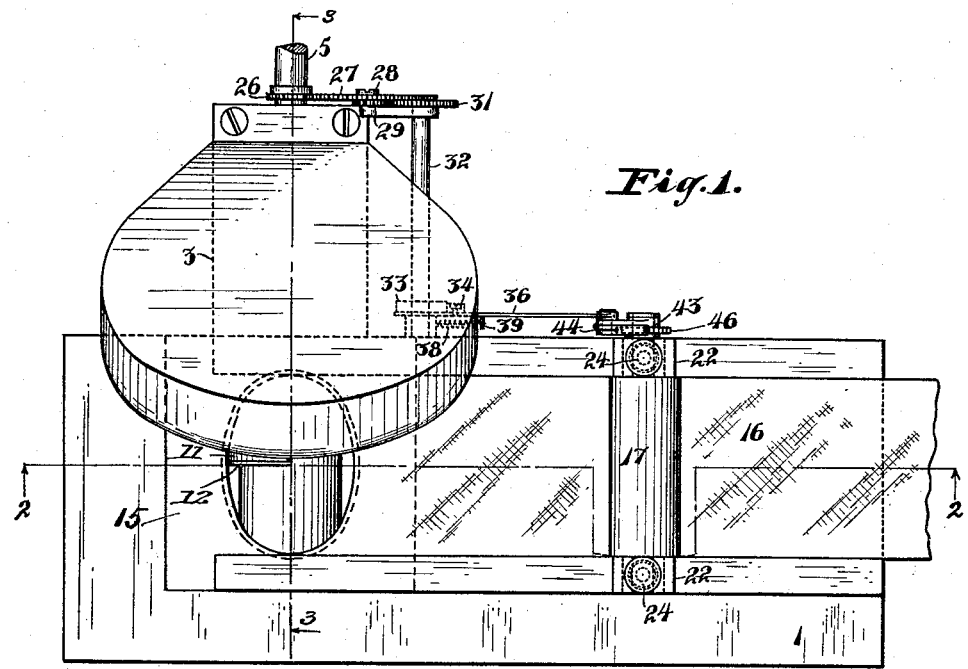
Figure 2:
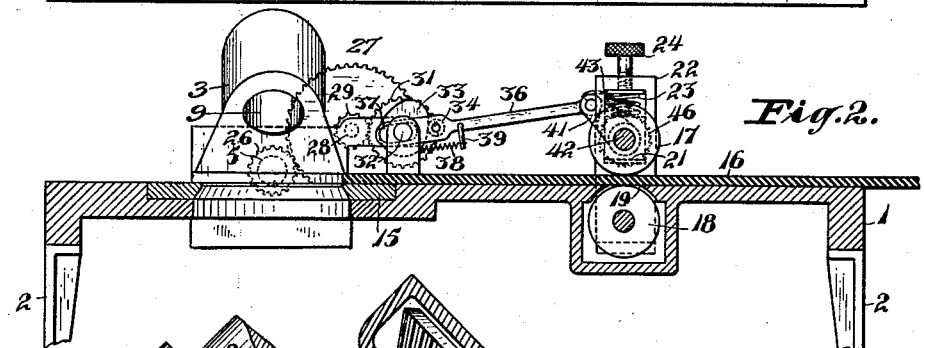
Figures 3, 4, 5:
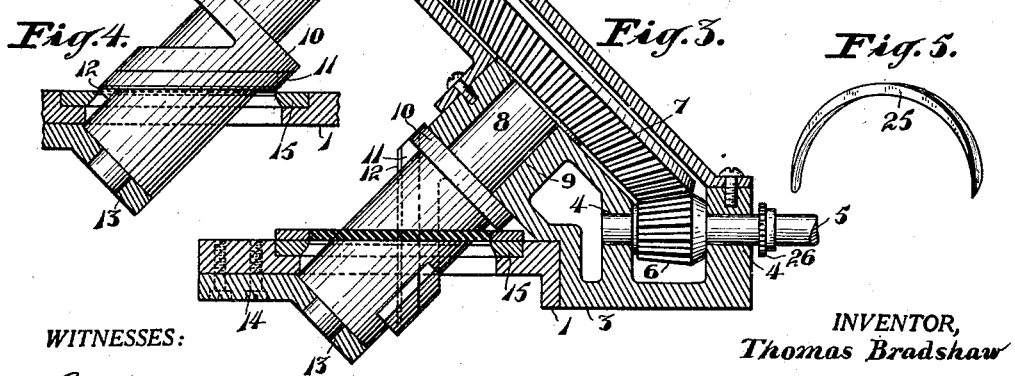

In the accompanying drawing, Figure 1 is a plan view of the machine; Fig. 2 is a longitudinal section of the same the cutter being omitted on the line 2—2 of Fig. 1; Fig. 3 is an enlarged transverse section of the same on the line 3—3 of Fig. 1; Fig. 4 is a broken transverse section showing the cutter in a position different from that in Fig. 3; and Fig. 5 is a detail plan view of a rubber strip cut by the machine.

Referring to the drawing, 1 indicates a table supported upon legs 2. Secured to said table is an extension 3 having bearings 4 for a driving shaft 5 upon which is secured a bevel pinion 6 meshing with a bevel gear 7 on a shaft 8 having a bearing 9 in said extension, and carrying a flanged head 10, to which is secured an oblique cylindrical cutter 11 having a removable blade 12. Said cutter is secured to said head so that its plane makes an angle at 45° with the axis of the head. The outer end of said shaft 8 rotates in a bearing 13 secured, as shown at 14, to the table. The cutter rotates in an elliptical hole in a die plate 15 resting in a recess in the table.

The rectangular sheet 16 of rubber belting is advanced by means of upper and lower rollers 17, 18, the table being formed with a transverse slot 19 to receive the lower roller 18 to enable it to press the sheet 16 of rubber belting between said lower roller and the upper roller 17, said upper roller rotating in boxes 21 vertically slidable in vertical guideways 22 and depressed by coiled springs 23, which in turn are depressed by screws 24 screwed through said guideways. Each time that the cutter rotates in the hole in the die plate, it cuts off a semi-elliptical strip, such as that shown at 25, from the advancing end of the rubber belting. In order to advance said rubber belting once for each rotation of the cutter, there is secured upon the shaft 5 a pinion 26 which meshes with a gear wheel 27 on a short shaft 28, on which shaft is also carried a pinion 29 which meshes with a gear wheel 31 on a short shaft 32 which also carries an eccentric 33 which engages a roller 34 on one end of a link 36, having a slot 37 around said shaft 32 and retracted by a spring 38 attached to a finger 39 on said link. The other end of the link is pivotally connected to an arm 41 loose on a shaft 42 at one end of the roller 17, on the end of which arm is a pawl 43 pressed by a spring 44 against a ratchet wheel 46 on said shaft. The diameters of the pinions 26, 29 and gear wheels 27, 31 are such that the link is reciprocated once with each revolution of the shaft 8. Thus, with each revolution of the shaft 8, the rubber belting is advanced a predetermined distance and a semi-elliptical strip of the desired width is cut off by the cutter 11.

I claim:—

1. In combination with a table, a die plate thereon, a shaft arranged obliquely to the plane of the die plate, a cutting blade secured to the shaft and having an arcuate edge, said cutter being so arranged relatively to the shaft that, in one position of its movement with the shaft, it is substantially in the plane of the die plate, the arcuate edge of the cutter being then closely adjacent to the edge of said plate.

2. In combination with a table, a die plate thereon, a shaft arranged obliquely to the plane of the die plate, a cutting blade secured to the shaft and having an arcuate edge, said cutter being so arranged relatively to the shaft that, in one position of its movement with the shaft, it is substantially in the plane of the die plate, the arcuate edge of the cutter being then closely adjacent to the edge of said plate, and means for automatically advancing the material to be cut with each revolution of said shaft.

In testimony whereof I have hereunto set my hand in the presence of two subscribing witnesses.

THOMAS BRADSHAW.

Witnesses:
FRANCIS M. WRIGHT,
G. M. BALL.